Patented Sept. 26, 1950

2,523,420

UNITED STATES PATENT OFFICE 2,523,420

BENZENE HEXACHLORIDE INSECTICIDE WITH WATER REPELLENT POWDERED VEHICLE

Leslie James Burrage, Liverpool, England, assignor to Imperial Chemical Industries Limited, a corporation of Great Britain No Drawing. Application July 11, 1945, Serial No. 604,497. In Great Britain July 17, 1944

10 Claims. (Cl. 167—42)

This invention relates to improvements in pest control compositions and more particularly to solid pest control compositions containing benzene hexachloride.

In British Patent No. 573,689 there have been described and claimed pest control agents comprising compositions of matter containing the gammaisomer of benzene hexachloride or a solution thereof, in intimate association with carrier material or diluent which is a non-solvent for the benzene hexachloride under the conditions of use. The benzene hexachloride could be the crude material obtained by chlorinating benzene under such conditions that addition of chlorine occurs with formation of a solution or a slurry of benzene hexachloride in unchanged benzene, and then removing unchanged benzene. In the present specification and claims such a material is referred to as crude benzene hexachloride.

According to the present invention pest control compositions comprise one or more isomers of benzene hexachloride in intimate association with a water-insoluble solid diluent in powder form which has been rendered water-repellent. Advantageously the benzene hexachloride is the gamma-isomer or a mixture of isomers containing a significant proportion of the gamma-isomer.

Such compositions have the advantage that they do not become agglomerated through exposure to moist or humid conditions, but remain free-flowing, and capable of distribution by a blower. Moreover, the compositions have the property of floating on the surface of water for a considerable time without sinking, and this is advantageous when it is desired to use the composition to treat pools of water, swamps, and like places which are favourable breeding places for mosquitoes or similar pests.

The inert diluent employed to make the composition may be any water-insoluble solid diluent which does not give alkaline solutions with water, for example slate dust, powdered limestone, powdered chalk, powdered pumice, kieselguhr, or powdered gypsum. The water-repellent properties may be imparted in known manner by coating the particles of the diluent with an oleaginous material, that is to say a waxy or oily substance such as paraffin wax, vegetable oils, stearic acid, oleic acid and other higher fatty acids occurring in animal and vegetable fats or waxes. The coating may be imparted, for example, by spraying the powder with a solution of the waxy or oily substance in a volatile solvent and then evaporating the solvent, or by milling or grinding the diluent while hot with the waxy or oily substance.

Thus a suitable material may be obtained by milling hot limestone dust with 0.1% to 10%, for example between 0.2% and 0.5%, of its weight of palm oil fatty acids. The treatment of the dust to render it water-repellent is preferably carried out before mixing with the benzene hexachloride, but it is also possible to impart the water-repellent properties after mixing with the benzene hexachloride.

Before incorporation the crude benzene hexachloride may be submitted to a deodorising treatment with nitric acid as described and claimed in British Patent No. 586,434, by treatment with silica gel or other adsorbent solid as described and claimed in British Patent No. 586,464, or by treatment with nascent hydrogen as described in copending British application No. 3,434/45. Instead of using crude benzene hexachloride, other mixtures of the isomers may be used, though it is preferred to use mixtures containing at least as high a proportion of the gamma-isomer as is present in crude benzene hexachloride, which is of the order of 10% to 12%. Thus substantially pure gamma-isomer may be used, or mixtures of the isomers containing a proportion of the gamma-isomer enhanced with respect to the proportion present in crude benzene hexachloride, such as may be obtained by extracting crude benzene hexachloride with a lower aliphatic alcohol as described in copending British application No. 9,416/43 or with other solvents for benzene hexachloride as described in British Patent Nos. 586,439 and 586,442.

The proportion of the benzene hexachloride to the inert diluent may vary within wide limits; thus the mixtures may contain between 1% and 20% by weight of crude benzene hexachloride. A convenient proportion for many purposes is 5% by weight. If gamma-isomer, or a concentrate containing an enhanced proportion of gamma-isomer, is employed, less of it will be needed to give a product of equal potency than when crude benzene hexachloride is used. Suitable amounts are in any event such that the composition between 0.1% and 2% by weight of the gamma-isomer, for example 0.5%.

The incorporation of the benzene hexachloride and the diluent may be carried out by merely mixing the two together in an appropriate apparatus, and if desired, to facilitate the mixing, the benzene hexachloride may previously be incorporated with powdered gypsum or other diluent in amount up to, say, three times its weight.

I claim:

1. A process for the production of a dust-like, water-repellent pest control composition which comprises treating a non-alkaline water-insoluble solid diluent in powder form with an oleaginous substance so as to render it water-repellent, and bringing the water-repellent diluent into intimate association with a benzene hexachloride comprising the gamma-isomer.

2. A process for the production of a dust-like, water-repellent pest control composition which comprises treating a non-alkaline water-insoluble solid diluent in powder form with an oleaginous substance so as to render it water-repellent, and bringing the water-repellent diluent into intimate association with crude benzene hexachloride comprising the gamma-isomer.

3. A process according to claim 2 in which the diluent is mixed with between 0.1% and 10% by weight of crude benzene hexachloride.

4. A process according to claim 2 in which the treated diluent is brought into intimate association with benzene hexachloride containing an amount of gamma-isomer enhanced with respect to the amount present in crude benzene hexachloride, the amount of such enchanced material being such that the resulting composition contains between 0.1% and 2% by weight of gamma-benzene hexachloride.

5. A process according to claim 2 in which the treated diluent is brought into intimate association with between 0.1% and 2% by weight of gamma-benzene hexachloride.

6. A dust-like water-repellent pest control composition comprising the gamma isomer of benzene hexachloride in intimate admixture with a non-alkaline water-insoluble solid diluent in powder form which has been rendered water repellent by coating the particles of the said diluent with an oleaginous material.

7. A dust-like water-repellent pest control composition as set forth in claim 6 wherein gamma benzene hexachloride is present in an amount of from 0.1% to 2% by weight.

8. A dust-like water-repellent pest control composition comprising crude benzene hexachloride containing the gamma isomer, said benzene hexachloride being in intimate admixture with a non-alkaline water-insoluble solid diluent in powder form which has been rendered water repellent by coating the particles of said diluent with an oleaginous material.

9. A dust-like water-repellent pest control composition as set forth in claim 8 wherein said crude benzene hexachloride comprises between 1% and 20% by weight of the composition.

10. A dust-like water-repellent pest control composition comprising the gamma isomer of benzene hexachloride in intimate admixture with a non-alkaline water-insoluble solid diluent in powder form which diluent has been rendered water-repellent by treating with from 0.1% to 10% by weight of an oleaginous material.

LESLIE JAMES BURRAGE.

REFERENCES CITED

The following references are of record in the file of this patent:

UNITED STATES PATENTS

| Number | Name | Date |
|---|---|---|
| 2,010,841 | Bender | Aug. 13, 1935 |
| 2,018,681 | Littooy | Oct. 29, 1935 |
| 2,242,639 | Barton | May 20, 1941 |
| 2,330,227 | Lynn | Sept. 28, 1943 |
| 2,349,814 | Deonier et al. | May 30, 1944 |

OTHER REFERENCES

Bory and Glaser Bulletin de l'Acadamie de Medicine, vol. 127 (1943), pages 728-30.